United States Patent
Jung

(10) Patent No.: US 8,391,037 B2
(45) Date of Patent: Mar. 5, 2013

(54) POWER SUPPLY APPARATUS WITH LOW POWER IN STANDBY MODE

(75) Inventor: Jee-hoon Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 678 days.

(21) Appl. No.: 12/510,335

(22) Filed: Jul. 28, 2009

(65) Prior Publication Data

US 2010/0054007 A1 Mar. 4, 2010

(30) Foreign Application Priority Data

Aug. 26, 2008 (KR) ........................ 10-2008-0083521

(51) Int. Cl.
*H02M 5/42* (2006.01)
*H02M 7/06* (2006.01)

(52) U.S. Cl. .......................................... 363/84; 363/126

(58) Field of Classification Search .............. 363/59, 363/60, 84, 125, 126
See application file for complete search history.

(56) References Cited

U.S. PATENT DOCUMENTS

| | | | |
|---|---|---|---|
| 6,429,725 B1 * | 8/2002 | Tanzawa et al. | 327/536 |
| 6,515,379 B1 * | 2/2003 | Nojima et al. | 307/64 |
| 7,719,863 B2 * | 5/2010 | Yeh et al. | 363/49 |

FOREIGN PATENT DOCUMENTS

JP 2007-089308 4/2007

* cited by examiner

*Primary Examiner* — Matthew Nguyen
(74) *Attorney, Agent, or Firm* — Stanzione & Kim, LLP

(57) ABSTRACT

Provided is a power supply apparatus with low power in a standby mode. The apparatus includes a voltage multiplier configured to multiply an input voltage and including a first terminal through which the multiplied voltage is output and a second terminal through which a voltage lower than a voltage of the first terminal is output; a main switch-mode power supply (SMPS) configured to receive the voltage of the first terminal of the voltage multiplier; and a standby SMPS configured to receive a voltage of the second terminal of the voltage multiplier.

3 Claims, 4 Drawing Sheets

POWER SUPPLY APPARATUS WITH LOW POWER IN STANDBY MODE

CROSS-REFERENCE TO RELATED APPLICATIONS

This application claims priority under 35 U.S.C. §119(a) from Korean Patent Application No. 10-2008-0083521, filed on Aug. 26, 2008, in the Korean Intellectual Property Office, the disclosure of which is incorporated herein in its entirety by reference.

BACKGROUND OF THE INVENTION

1. Field of the Invention

The present general inventive concept relates to a power supply apparatus, and more particularly, to a power supply apparatus with low power in a standby mode.

2. Description of the Related Art

In order to reduce the sizes and heat generation of power supply apparatuses and economize on energy of systems, it is absolutely necessary for the power supply apparatuses to convert power at high efficiency. In particular, zero-voltage switching (ZVS) or zero-current switching (ZCS) is enabled using resonant converters with various shapes to minimize heat generation and power consumption of switch devices, so that power supply apparatuses can operate very efficiently at a rated load or higher.

In most resonant converters, as a primary-side circulating current increases, it causes more conduction loss, thereby degrading the efficiency of the resonant converters. Accordingly, it is more desirable to boost an input voltage. Therefore, in order to use a resonant converter in a place with a low input voltage of about 110V, it is necessary to boost the input voltage using a voltage controller, such as a boost-type active power factor correction (PFC) or a voltage multiplier. However, the boosting of the input voltage may result in the reduction of power efficiency in a standby mode. This is because power loss in the standby mode is mainly caused by switching loss, which is proportional to the square of the input voltage.

Therefore, developing a new technique for minimizing power consumption even in the standby mode is needed.

SUMMARY OF THE INVENTION

The present general inventive concept provides a power supply apparatus capable of minimizing power consumption in a standby mode.

The present general inventive concept also provides an image forming apparatus including the power supply apparatus.

Additional aspects and utilities of the present general inventive concept will be set forth in part in the description which follows and, in part, will be obvious from the description, or may be learned by practice of the general inventive concept.

Embodiments of the present general inventive concept can be achieved by providing a power supply apparatus including a voltage multiplier configured to multiply an input voltage and including a first terminal through which the multiplied voltage is output and a second terminal through which a voltage lower than the multiplied voltage is output, a main switch-mode power supply (SMPS) configured to receive the voltage of the first terminal of the voltage multiplier, and a standby SMPS configured to receive a voltage of the second terminal of the voltage multiplier.

The voltage multiplier may include a rectifier circuit configured to rectify the input voltage, and a smoothing circuit configured to smooth the rectified voltage and connected in parallel to the rectifier circuit, the smoothing circuit including a first capacitor and a second capacitor connected in series.

The main SMPS may receive voltages from the ends of the serially connected first and second capacitors of the smoothing circuit as input voltages, and the standby SPMS may receive voltage from the ends of the second capacitor of the smoothing circuit as input voltages.

Embodiments of the present general inventive concept can also be achieved by providing an image forming apparatus including a power supply apparatus with low power in a standby mode, and an image formation unit configured to receive power from the power supply apparatus and form images, wherein the power supply apparatus includes a voltage multiplier configured to multiply an input voltage and including a first terminal through which the multiplied voltage is output and a second terminal through which a voltage lower than the multiplied voltage is output, a main SMPS configured to receive the voltage of the first terminal of the voltage multiplier as an input voltage, and a standby SMPS configured to receive a voltage of the second terminal of the voltage multiplier as an input voltage.

Embodiments of the present general inventive concept can also be achieved by providing a power supply apparatus including a rectifier configured to rectify input power, a voltage multiplier configured to multiply the input power, a switch unit configured to switch to the rectifier or the voltage multiplier in response to a predetermined control signal, a main SMPS connected to the rectifier or the voltage multiplier based on the switching of the switch unit, and a standby SMPS connected to the rectifier or the voltage multiplier based on the switching of the switch unit.

The rectifier may rectify the input power and may output power controlled by the switching of the switching unit, and the voltage multiplier may be connected in parallel to the rectifier, multiply the input power, and output the output power controlled by the switching of the switch unit, the voltage multiplier may include a first capacitor and a second capacitor.

The switch unit may switch to the rectifier or the voltage multiplier depending on an external operating mode.

The switch unit may switch to the rectifier or the voltage multiplier depending on output powers of the main SMPS and the standby SMPS.

The foregoing and/or other aspects and utilities of the present general inventive concept can also be achieved by providing an image forming apparatus including the power supply apparatus with low power in the standby mode and an image forming unit.

Embodiments of the present general inventive concept can also be achieved by providing a power supply apparatus may include a first SMPS configured to receive a first voltage of a power source to generate a first power to an electronic device in a first mode of the electronic device, and a second SMPS configured to receive a second voltage of the power source to generate a second power to the electronic device in a second mode of the electronic device.

The second power may be lower than the first power.

The power source may include a voltage multiplier to receive an input voltage, the voltage multiplier having a first terminal to output the first voltage and a second terminal to output the second voltage.

The power supply apparatus may further included a switch unit configured to switch the power source to output the first voltage or the second voltage according to a predetermined control signal.

The power source may include a rectifier to output the first voltage based on the predetermined control signal, and a voltage multiplier to output the second voltage based on the predetermined control signal.

The first mode may correspond to a powered on status of the electronic device, and the second mode may correspond to a standby status of the electronic device Embodiments of the present general inventive concept can also be achieved by providing an image forming apparatus including an image formation unit configured to receive power from a power supply apparatus with low power in a standby mode, the power supply apparatus may include a first SMPS configured to receive a first voltage of a power source to generate a first power to the image formation unit in a first mode of the image formation unit, and a second SMPS configured to receive a second voltage of the power source to generate a second power to the image formation unit in a second mode of the image formation unit.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF EMBODIMENTS

Figure 1:
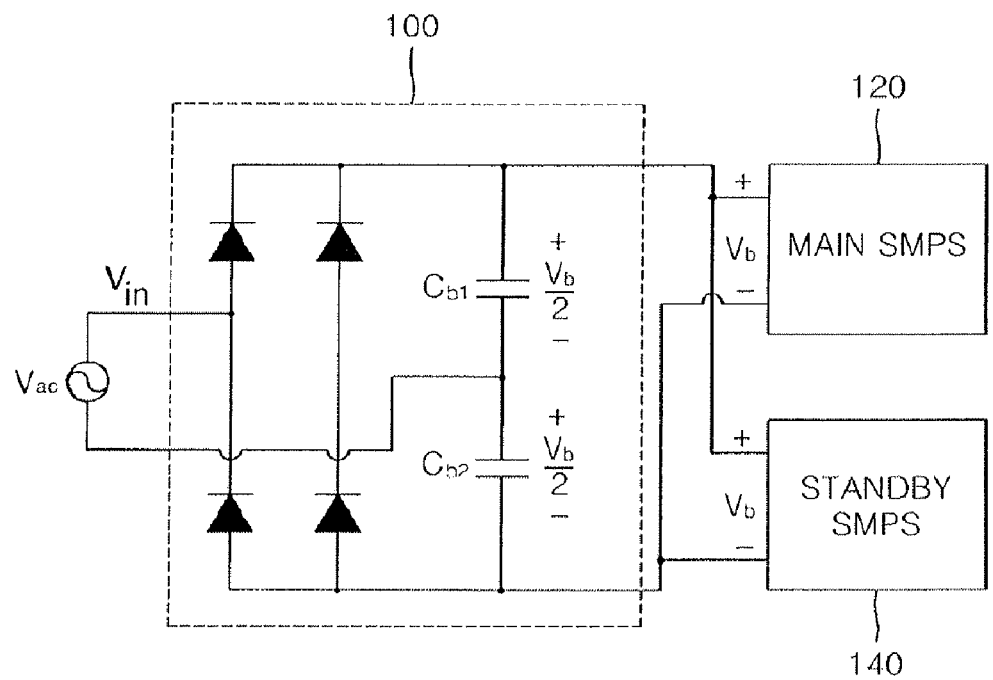
FIG. 1 is a block diagram illustrating a power supply apparatus with a double converter structure to which an input voltage multiplication method is applied.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of a power supply apparatus with a double converter structure to which an input voltage multiplication method is applied.

Referring to FIG. 1, an input unit of the power supply apparatus includes a voltage multiplier 100. The voltage multiplier 100 of the input unit may be used to boost the input voltage. In this case, when the power supply apparatus is used in a place with a low alternating-current (AC) input voltage of about 110 Vac (85~135 Vac), the input voltage of the power supply apparatus may be doubled. That is, assuming that a root mean square (RMS) input voltage is $V_{in}$, a direct-current (DC) bulk voltage $V_b$ rectified by the voltage multiplier 100 is expressed as in Equation 1:

$$V_b = 2\sqrt{2} V_{in} \quad (1).$$

When the input voltage of the power supply apparatus is boosted, a resonant topology, which is widely used for high-efficiency power conversion in a power supply apparatus, may be effectively employed. That is, when the input voltage of the power supply apparatus is boosted, a primary-side circulating current of the resonant topology may be lessened, thereby minimizing power loss during power conversion caused by resonance. Since the resonant topology is mainly highly efficient in a high-capacity device, it may be applied to high-capacity converters. Accordingly, in the power supply apparatus shown in FIG. 1, the resonant topology may be efficiently applied to a main switch-mode power supply (SMPS) 120.

However, it is inefficient to apply the resonant topology to a low-capacity converter, such as a standby SMPS 140 of FIG. 1, which needs to operate at high efficiency under low-power conditions, such as a standby mode. Since conduction loss caused by a circulating current of the resonance topology continuously occurs even at a low output load, a large amount of power loss is caused as contrasted with output under the low-power conditions, so that power efficiency decreases in the standby mode. Also, since the resonant topology is complex to configure and requires high cost of materials, it is applied not to a low-capacity converter, such as a standby SMPS, but to a flyback converter with the simplest structure. The flyback converter may efficiently operate under low-power conditions because no circulating current is generated unlike in the resonant topology.

However, as illustrated in FIG. 1, when input power is doubled by a voltage multiplication method and rectified, standby-mode efficiency of the flyback converter may be reduced. This is due to the fact that loss of the flyback converter in a low-power state, such as a standby mode, is chiefly caused by switching, and switching loss of a metal-oxide-semiconductor field effect transistor (MOSFET) serving as a main switch is proportional to the square of a voltage applied to both ends of the switch as shown in Equation 2:

$$P_{sw,loss} = \frac{1}{2} C_{oss} V_{DS}^2 = \frac{1}{2} C_{oss} (V_b + nV_o)^2, \quad (2)$$

wherein $P_{sw,loss}$ denotes MOSFET switching loss, $C_{oss}$ denotes MOSFET output capacitance, $V_{DS}$ denotes drain-to-source voltage, "n" denotes a turn ratio of a transformer, and $V_o$ denotes an output voltage. In Equation 2, when a DC bulk voltage $V_b$ is doubled by the voltage multiplier 100, switching loss is also approximately doubled. Accordingly, when an input voltage is boosted using the voltage multiplier 100 in order to increase the efficiency of the high-capacity main SMPS 120, the standby-mode efficiency of the standby SMPS 140 is reduced.

Figure 2:
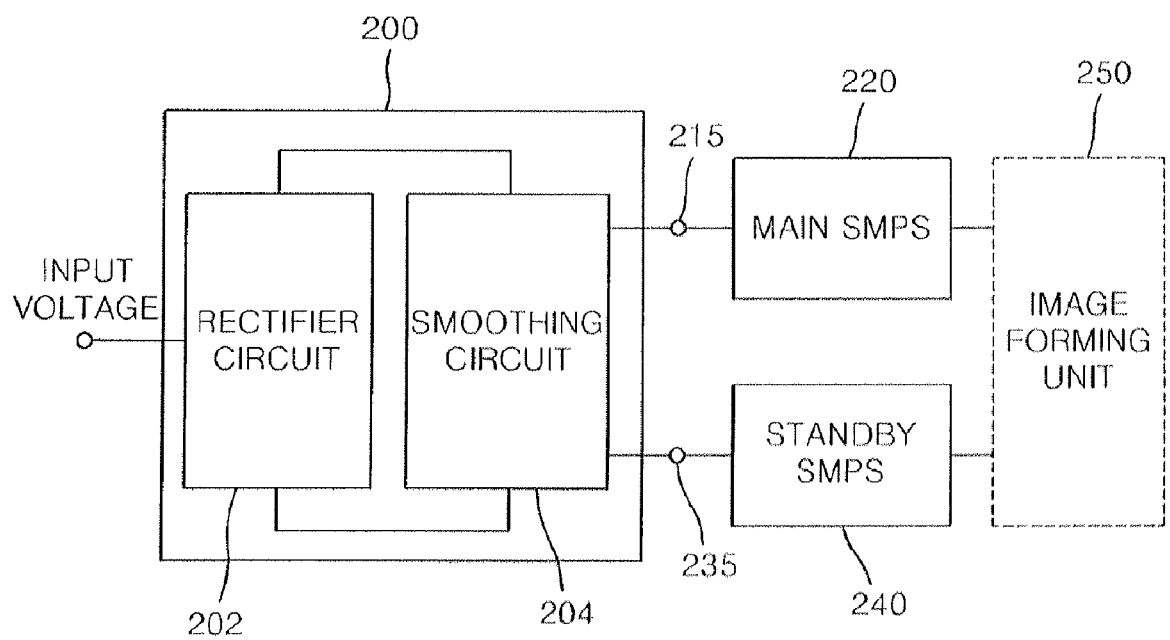
FIG. 2 is a block diagram illustrating a power supply apparatus with low power in a standby mode according to an exemplary embodiment of the present general inventive concept.

FIG. 2 is a block diagram of a power supply apparatus with low power in a standby mode according to an exemplary embodiment of the present general inventive concept. The power supply apparatus illustrated in FIG. 2 adopts a voltage multiplier using an input rectification method in order to improve standby power efficiency.

The power supply apparatus illustrated in FIG. 2 may include a voltage multiplier 200, a main SMPS 220, and a standby SMPS 240.

The voltage multiplier 200 may multiply an input voltage and may include a first terminal 215 through which the multiplied voltage is output and a second terminal 235 through which a voltage lower than the voltage of the first terminal 215 is output. The voltage multiplier 200 may include a rectifier circuit 202 and a smoothing circuit 204. The rectifier circuit 202 may rectify the input voltage. The smoothing circuit 204 may smooth the voltage rectified by the rectifier circuit 202 and be connected in parallel to the rectifier circuit 202. The smoothing circuit 204 may be embodied by two capacitors connected in series.

The main SMPS 220 may receive the voltage of the first terminal 215 of the voltage multiplier 200 as an input voltage, while the standby SMPS 240 may receive the voltage of the second terminal 235 of the voltage multiplier 200 as an input voltage.

Figure 6:
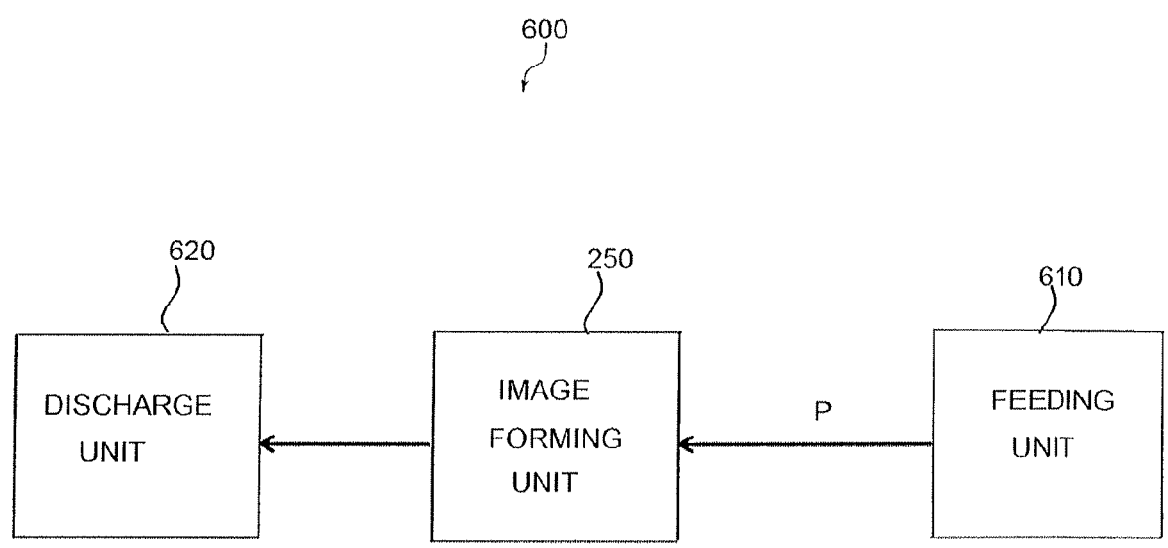
FIG. 6 illustrates an image forming apparatus according to an embodiment of the present general inventive concept.

An image forming apparatus according to the present general inventive concept may include the above-described power supply apparatus shown in FIG. 2 and an image forming unit 250 shown in FIG. 2. The image forming apparatus 600, as shown in FIG. 6 may also include additional elements, such as a feeding unit 610 and a discharge unit 620. The image forming unit 250 may include a cartridge to eject ink onto a printing medium. The power supply apparatus as shown in FIG. 2 may supply power to the image forming apparatus 600. Upon receiving a power supply, the printing medium is fed from the feeding unit 610 to the image forming unit 250 along path P of the printing medium. An image is formed on the printing medium by the image forming unit 250, and the printing medium is discharged by the discharge unit 620.

Figure 3:
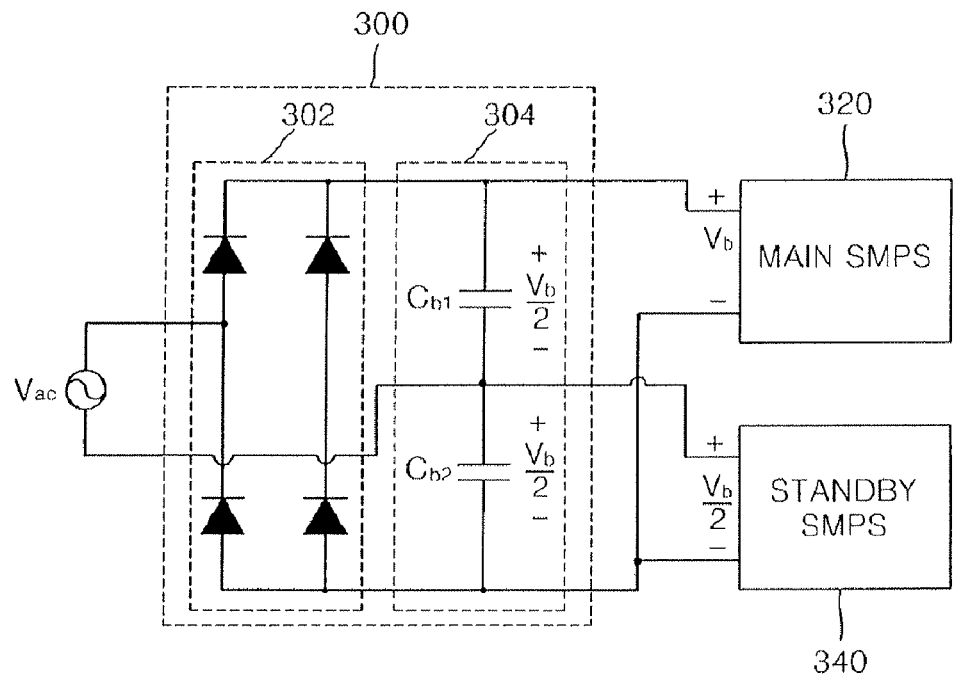
FIG. 3 illustrates an example illustrating the power supply apparatus shown in FIG. 2.

FIG. 3 illustrates an example of the power supply apparatus of FIG. 2. In FIG. 3, the voltage multiplier 200 of FIG. 2 corresponds to a voltage multiplier 300, the rectifier circuit 202 of FIG. 2 corresponds to a rectifier circuit 302, and the smoothing circuit 204 of FIG. 2 corresponds to a smoothing circuit 304. Also, the main SMPS 220 and the standby SMPS 240 of FIG. 2 correspond to a main SMPS 320 and a standby SMPS 340, respectively.

The smoothing circuit 304 may include two capacitors $C_{b1}$ and $C_{b2}$ connected in series. The main SMPS 320 may receive voltages from the ends of the first and second capacitors $C_{b1}$ and $C_{b2}$ connected in series as input voltages, while the standby SMPS 340 may receive voltages from the ends of the second capacitor $C_{b2}$ of the smoothing circuit 304 as input voltages.

A power supply apparatus according to the present exemplary embodiment will now be described in more detail. In order to reduce standby-mode power, the main SMPS 220 (or 320) may be turned off, and the power conversion loss of the standby SMPS 240 (or 340) may be reduced using a technique for reducing switching loss, for example, a burst mode or a skip cycle. When the standby SMPS 240 (or 340) is connected to the second capacitor $C_{b2}$ of the voltage multiplier 200 (or 300), a DC bulk voltage $V_b$ applied to the standby SMPS 240 (or 340) may be half a voltage applied to the main SMPS 220 (or 320). Accordingly, switching loss caused to the standby SMPS 240 (or 340) may be calculated as shown in Equation 3:

$$P_{sw,loss} = \frac{1}{2}C_{oss}V_{DS}^2 = \frac{1}{2}C_{oss}\left(\frac{1}{2}V_b + nV_o\right)^2. \quad (3)$$

As can be seen from Equation 3, the standby SMPS 240 (or 340) may reduce a voltage applied to a switch by 33% and also, reduce switching loss by 50%, as compared with when a multiplied output voltage is used. Also, since a voltage applied to a switch of the standby SMPS 240 (or 340) is reduced by half, voltage stress applied to the standby SMPS 240 (or 340) may be lessened and a more inexpensive switch may be used. However, according to the above-described method, since the upper capacitor $C_{b1}$ has a different load from the lower capacitor $C_{b2}$, that is, since the lower capacitor $C_{b2}$ has a higher load than the upper capacitor $C_{b1}$ based on the load of the standby SMPS 240 (or 340), there may be a voltage disparity between the capacitors $C_{b1}$ and $C_{b2}$ (not shown in FIG. 3). Additionally, a ripple voltage may increase in the capacitor $C_{b2}$ connected to the standby SMPS 240 (or 340) so that the average voltage applied to both ends of the capacitor $C_{b2}$ may be reduced by half the ripple voltage. In other words, a ripple voltage that has been smoothed results in a voltage of half the ripple voltage, therefore when the ripple voltage increases, this ratio is preserved, and the average voltage applied to both ends of the capacitor $C_{b2}$ is reduced by half.

When there is a voltage disparity between the output capacitors $C_{b1}$ and $C_{b2}$ of the voltage multiplier 200 (or 300) as described above, the lifespans of the capacitors $C_{b1}$ and $C_{b2}$ may be shortened. Accordingly, the above-described method may be employed when a voltage difference between the capacitors $C_{b1}$ and $C_{b2}$ is within an allowable limit. For example, when the capacity of the standby SMPS 240 (or 340) is 20% or lower of that of the main SMPS 220 (or 320), the above-described method may be used.

Figure 4:
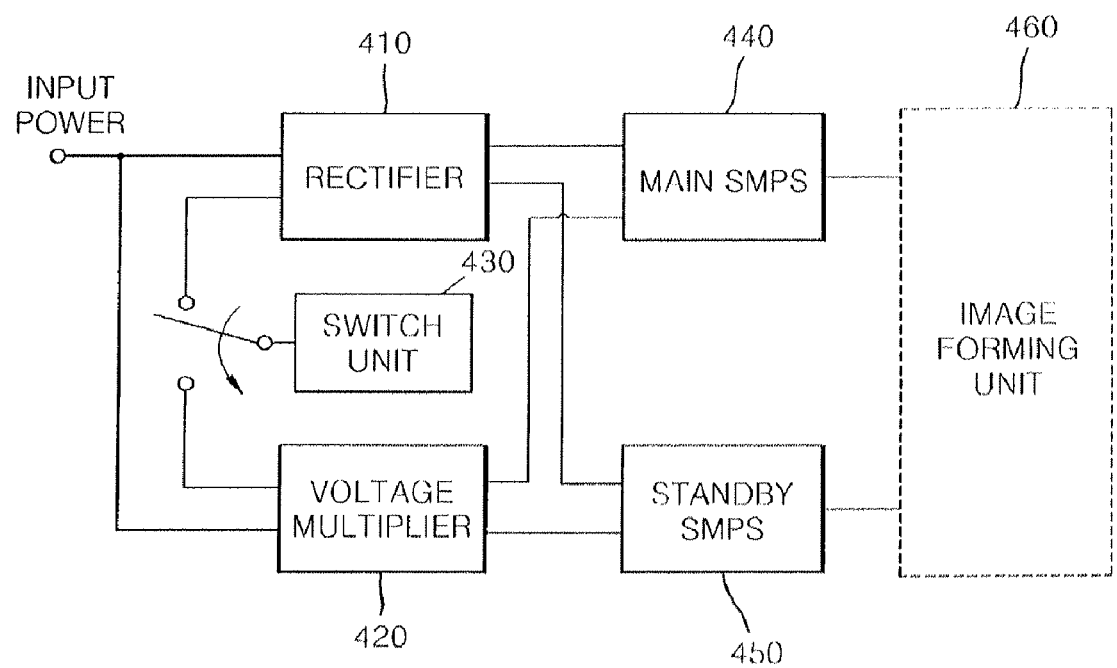
FIG. 4 is a block diagram illustrating a power supply apparatus with low power in a standby mode according to another exemplary embodiment of the present general inventive concept

FIG. 4 is a block diagram of a power supply apparatus with low power in a standby mode according to another exemplary embodiment of the present general inventive concept. The power supply apparatus shown in FIG. 4 adopts a voltage multiplier using an input rectification method in order to improve standby power efficiency.

The power supply apparatus shown in FIG. 4 may include a rectifier 410, a voltage multiplier 420, a switch unit 430, a main SMPS 440, and a standby SMPS 450.

The rectifier 410 may rectify input power and then output power controlled by the switching of the switch unit 430.

The voltage multiplier 420, which is connected in parallel to the rectifier 410, may multiply the input power and output power controlled by the switching of the switch unit 430. The voltage multiplier 420 may include two capacitors connected in series.

The switch unit 430 may switch to the rectifier 410 or the voltage multiplier 420 in response to a predetermined control signal, which depends on an external operating mode or output powers of the main SMPS 440 and the standby SMPS 450.

The main SMPS 440 may be connected to the rectifier 410 or the voltage multiplier 420 based on the switching of the switch unit 430.

The standby SMPS 450 may be connected to the rectifier 410 or the voltage multiplier 420 based on the switching of the switch unit 430.

An image forming apparatus according to the present general inventive concept may include the above-described power supply apparatus shown in FIG. 4 and an image forming unit 460 shown in FIG. 4.

Figure 5:
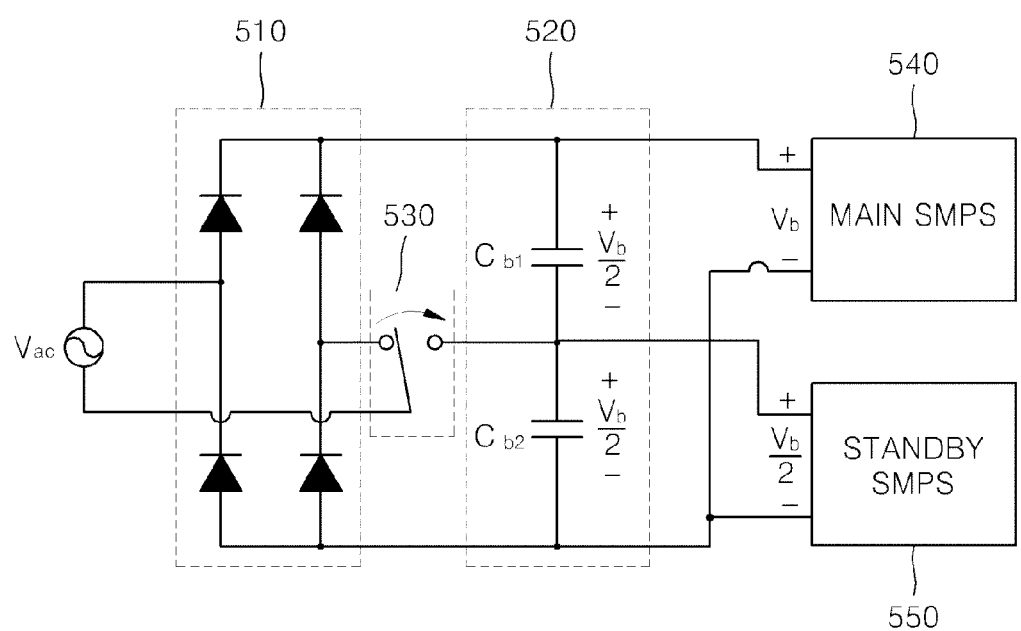
FIG. 5 illustrates an example of the power supply apparatus shown in FIG. 4.

FIG. 5 illustrates an example of the power supply apparatus shown in FIG. 4. In FIG. 5, the rectifier 410 of FIG. 4 corresponds to a rectifier 510, the voltage multiplier 420 of FIG. 4 corresponds to a voltage multiplier 520, and the switch unit 430 of FIG. 4 corresponds to a switch unit 530. Also, the main SMPS 440 and the standby SMPS 450 of FIG. 4 correspond to a main SMPS 540 and a standby SMPS 550, respectively. The rectifier 510 may be referred to as a bridge diode. The voltage multiplier 520 may be referred to as a serial capacitor.

As stated above, in the power supply apparatus shown in FIG. 3, when the standby SMPS 340 has a high capacity, a voltage disparity is caused between the output capacitors $C_{b1}$ and $C_{b2}$ of the voltage multiplier 300 so that a ripple voltage of the DC bulk voltage $V_b$ may increase and more stress may be applied to the standby SMPS 340. Accordingly, when the capacity of the standby SMPS 340 exceeds 20% of that of the main SMPS 320, the structure shown in FIG. 5 may be appropriately used.

When the electrically controlled switch unit 430 (or 530) is connected between the bridge diode 510 and the serial capacitor 520, the switch unit 430 (or 530) may be selectively switched between a full-bridge rectification mode and a multiplied voltage rectification mode. Thus, in a steady mode in which the main SMPS 440 (or 540) operates, the switch unit 430 may enter into the multiplied voltage rectification mode and double an input DC bulk voltage $V_b$ to maximize the efficiency of the main SMPS 440 (or 540). In contrast, in a standby mode in which the main SMPS 440 (or 540) does not operate, the switch unit 430 may enter into the full-bridge rectification mode and minimize standby-mode power loss of the standby SMPS 450 (or 550). In this case, the standby SMPS 450 (or 550) normally operates in both the multiplied voltage rectification mode and the full-bridge rectification mode. That is, since the standby SMPS 450 operates within a wide range of input voltages, it may be designed based on a universal input method.

In general, a low-capacity flyback capacitor with high low-power efficiency may be used as the standby SMPS 450 (or 550). The flyback converter may be designed to operate within a wide range of input voltages because it is based on a buck-boost method.

The rectification mode of the switch unit 430 (or 530) may be controlled by applying an external signal according to an operating mode. For example, when an image forming apparatus using the power supply apparatus enters into a standby mode, the standby mode may be used to control the rectification mode of the switch unit 430 (or 530).

Alternatively, the rectification mode of the switch unit 430 (or 530) may be controlled depending on whether the main SMPS 440 (or 540) or the standby SMPS 450 (or 550) is operating based on the output powers thereof. The output powers of the main SMPS 440 (or 540) and the standby SMPS 450 (or 550) may be based, respectively, on the voltages received by the main SMPS 440 (or 540) and the standby SMPS 450 (or 550). An electronic device may be configured to receive the respective output powers of the main SMPS 440 (or 540) and the SMPS 450 (or 550). The electronic device may have a first mode that corresponds to a powered on status, and a second mode that corresponds to a standby status.

In the exemplary embodiment shown in FIG. 2, as compared with when a multiplied output voltage is used as it is, a voltage applied to a switch can be reduced by about 33%, and switching loss can be also reduced by about 50%.

As compared with a case where a multiplied output voltage is used, a voltage applied to a switch can be reduced and switching loss can be also reduced. Also, since a voltage applied to a switch of a standby SMPS is reduced by half, voltage stress applied to the standby SMPS can be lessened and an inexpensive switch may be adopted. However, the power supply apparatus shown in FIG. 2 may be used only when the standby SMPS has a low capacity because a voltage disparity may occur between output capacitors connected in series in a voltage multiplier.

In the exemplary embodiment shown in FIG. 4, when a power supply apparatus is in a steady mode, a switch unit may enter into a multiplied voltage rectification mode to maximize the efficiency of a main SMPS; while when the power supply apparatus is in a standby mode, the switch unit may enter into a full-bridge rectification mode to minimize switching loss of a standby SMPS. As a result, even if the standby SMPS has a high capacity, the power of a rectifier capacitor can be uniformly used, thereby preventing occurrence of a voltage disparity.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A power supply apparatus comprising:
   a voltage multiplier configured to multiply an input voltage and including a first terminal through which the multiplied voltage is output and a second terminal through which a voltage lower than the multiplied voltage is output;
   a main switch-mode power supply (SMPS) configured to receive the voltage of the first terminal of the voltage multiplier; and
   a standby SMPS configured to receive a voltage of the second terminal of the voltage multiplier, the standby SMPS to receive a reduced power when the voltage to the main SMPS is turned off and to reduce a switching loss by using at least one of a burst mode and a skip cycle.

2. The apparatus of claim 1, wherein the voltage multiplier comprises:
   a rectifier circuit configured to rectify the input voltage; and
   a smoothing circuit configured to smooth the rectified voltage and connected in parallel to the rectifier circuit, the smoothing circuit including a first capacitor and a second capacitor connected in series.

3. The apparatus of claim 2, wherein the main SMPS receives voltages of ends of the serially connected first and second capacitors of the smoothing circuit as input voltages, and the standby SMPS receive voltages of both ends of the second capacitor of the smoothing circuit as input voltages.

* * * * *